Jan. 26, 1965  E. O. MARTINSON  3,167,307
SELF-BATCHING MIXER
Filed April 23, 1963  5 Sheets-Sheet 1
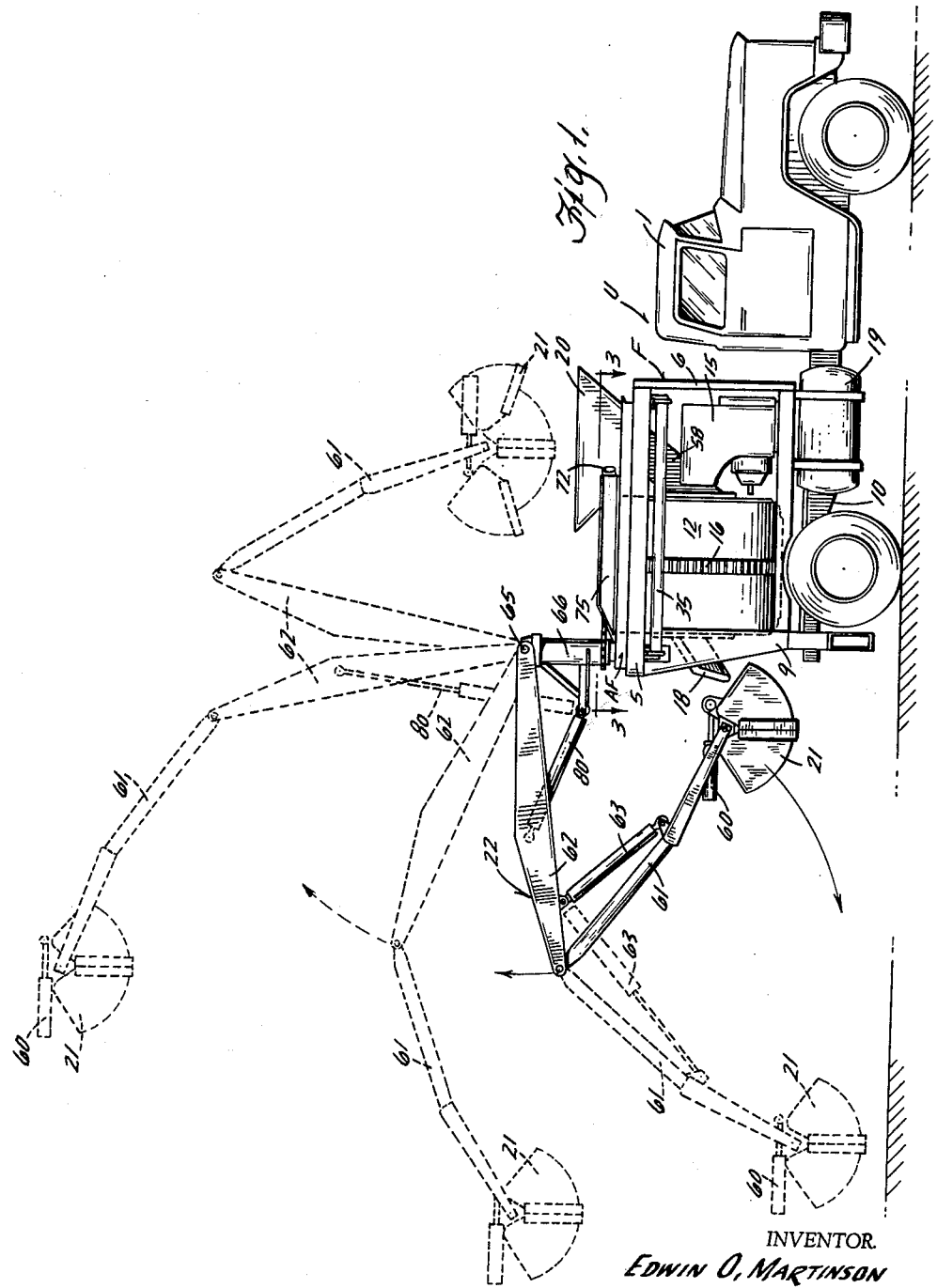
INVENTOR.
EDWIN O. MARTINSON
BY John F. Friedl
ATTORNEY.

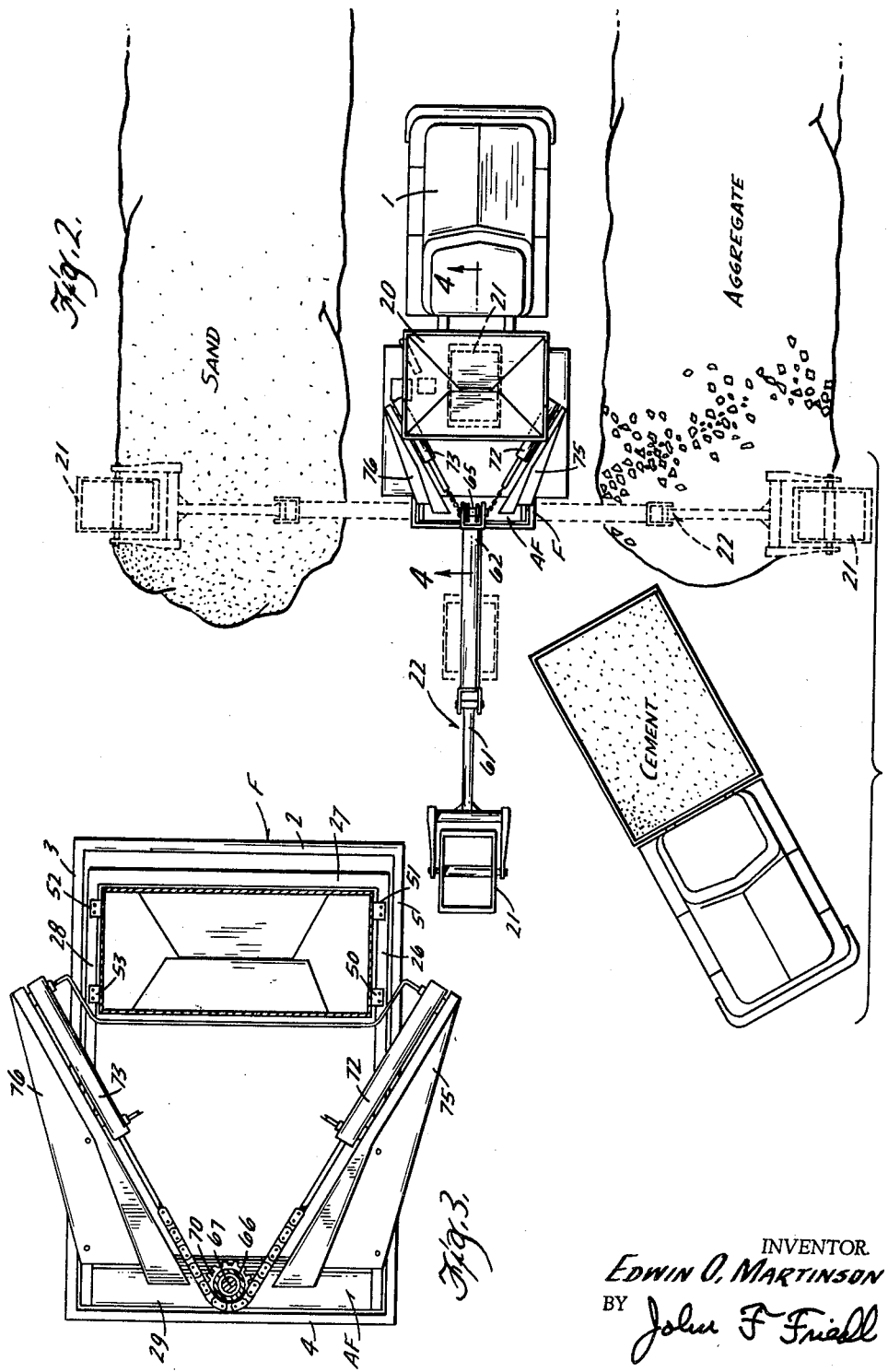

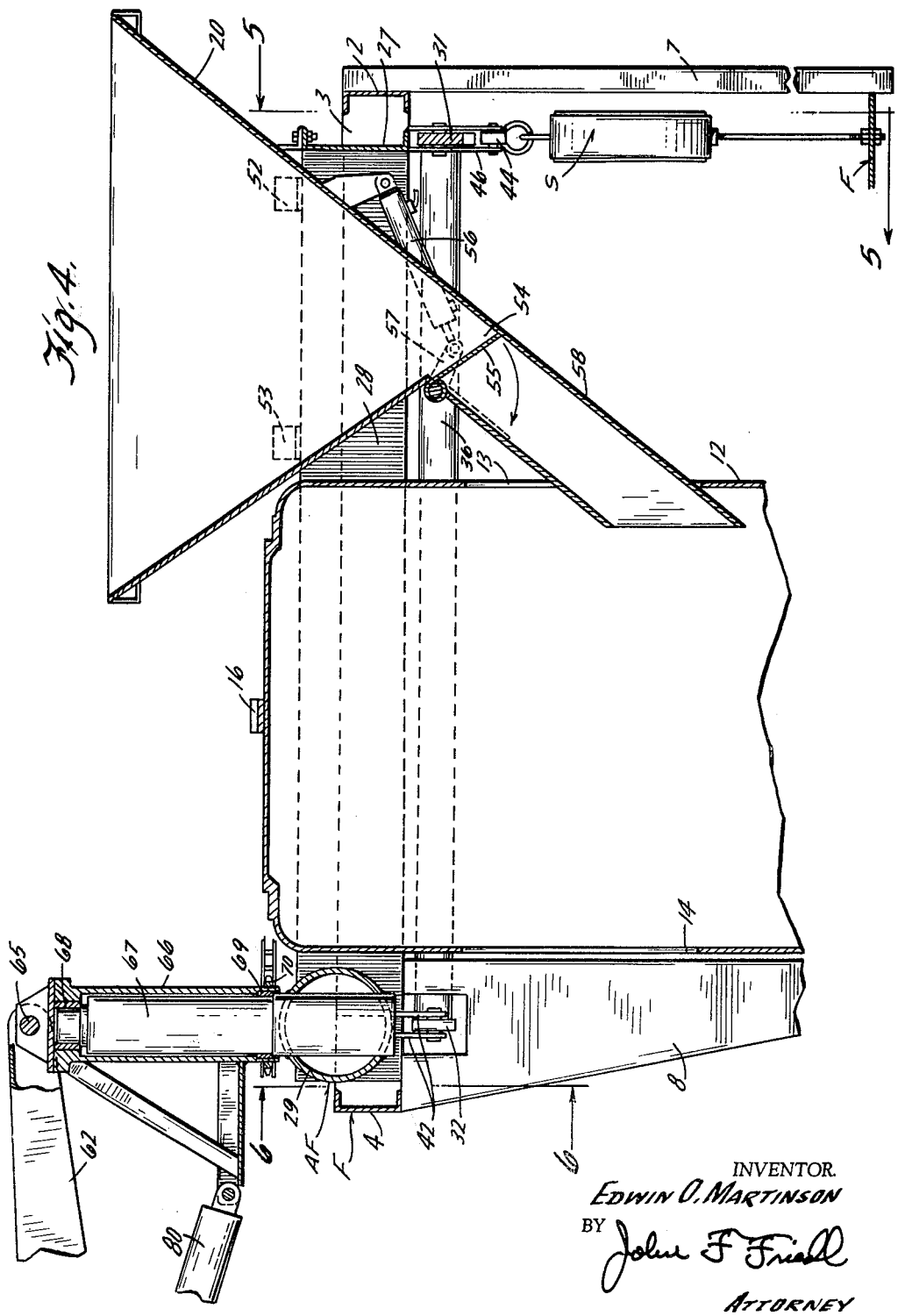

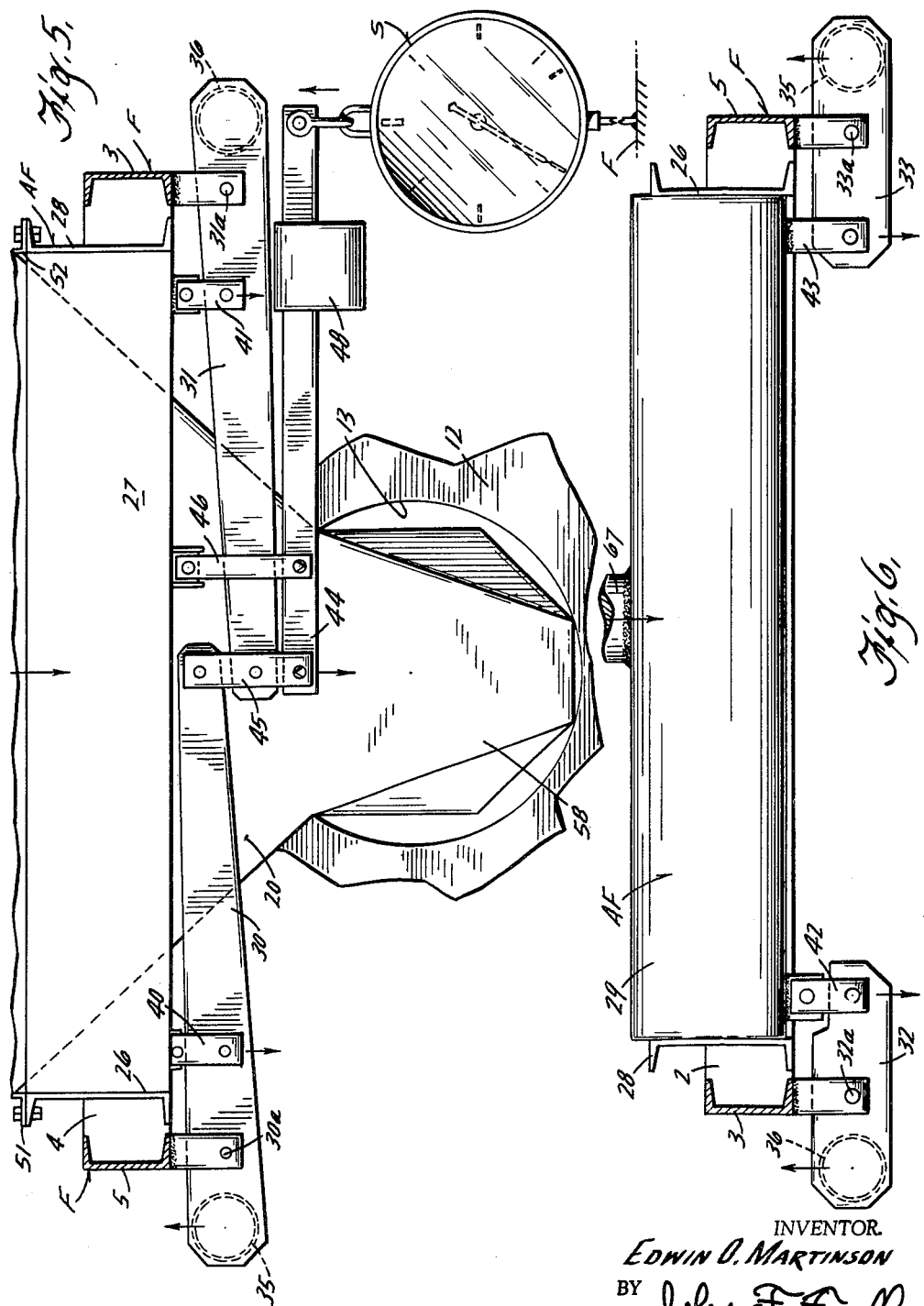

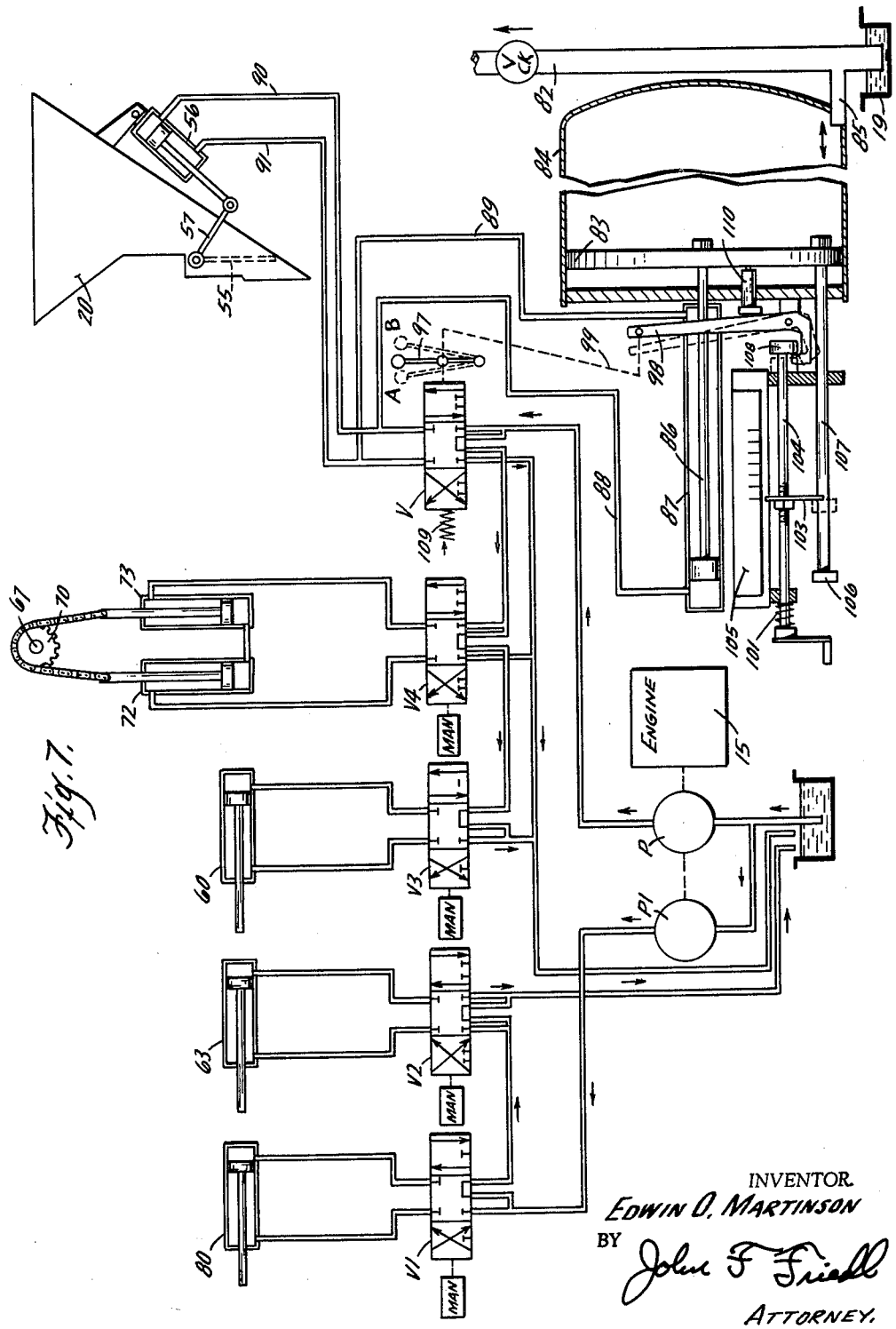

United States Patent Office 3,167,307
Patented Jan. 26, 1965

3,167,307
SELF-BATCHING MIXER
Edwin O. Martinson, Milwaukee, Wis., assignor to Koehring Company, Milwaukee, Wis., a corporation of Wisconsin
Filed Apr. 23, 1963, Ser. No. 274,978
6 Claims. (Cl. 259—154)

This invention relates generally to mobile batching, mixing, and dispensing equipment for bulk materials, such as concrete mixtures. More particularly, the present invention relates to such equipment having an improved mounting structure for both a hydraulically actuated clam bucket and a batch storage hopper whereby both the hopper and bucket contents can be accumulatively weighed.

The present invention is in the nature of an improvement over the apparatus shown and described in my U.S. Patent No. 2,926,796, issued on March 1, 1960, and entitled "Self-Charging Mixing and Dispensing Apparatus." Briefly, that apparatus provided for the weighing of the material in the clam bucket only, and this frequently resulted in error due to the operator forgetting the number of or weights of previous clam loads.

In accordance with the present invention, there is provided a mobile batching, mixing, and dispensing unit which overcomes the shortcomings of the above and other prior art devices and in which the power clam bucket and storage hopper are both mounted on a single frame that constitutes a rugged mechanical scale. The arrangement is such that an accumulative weighing device is provided that eliminates the necessity of the operator to remember the partial weights of previous bucket loads; as the material is lifted by the bucket from the stockpile, the excess material can be dribbled back into the stockpile until the desired weight is reached, and there is no necessity of returning excess material from the hopper to the stockpile.

Another aspect of the present invention relates to apparatus of the above type which has an accumulating storage hopper in which a batch may be first accumulated, weighed, and then discharged into the mixer; the hopper can then be used to store another batch while the entire unit is in transit and the first batch is being mixed.

Another aspect of the present invention relates to a particular articulated boom construction for the bucket of the above unit in which the arrangement of the hydraulic rams and the geometry of the boom sections are such that ease and accuracy of control and good "feel" are provided for the operator. More specifically, when the rams for the main section and outer arm section of the boom are fully retracted, the bucket is then positioned at the proper height for receiving concrete from the mixer; when the main section ram is fully extended and the outer arm section ram is fully retracted, then the clam is at the proper height for being centered over the hopper, and the operator need not estimate these positions.

Another object of the invention is to provide a mobile, self-batching mixer having fluid pressure operated means for a water batcher and for the discharge door of a storage hopper whereby a single control is used to load the mixer with water and other material. A more limited aspect of this object is to also provide means for automatically stopping the water charging operation when the desired water volume is obtained, and then returning the control mechanism, the hopper door and the water batcher mechanism to their original positions.

These and other objects and advantages of the present invention will appear hereinafter as this disclosure progresses, reference being had to the accompanying drawings, in which:

FIGURE 1 is a side elevational view of a mobile batching, mixing, and dispensing unit embodying the present invention;

FIGURE 2 is a plan view of the FIGURE 1 unit, but on a reduced scale;

FIGURE 3 is a fragmentary sectional view taken along line 3—3 in FIGURE 1, but on an enlarged scale;

FIGURE 4 is a fragmentary sectional view taken generally along line 4—4 in FIGURE 2, but on an enlarged scale;

FIGURE 5 is a sectional view taken along line 5—5 in FIGURE 4;

FIGURE 6 is a sectional view taken along line 6—6 in FIGURE 4; and

FIGURE 7 is a diagram of the hydraulic circuit including the water batching mechanism.

Referring in greater detail to the drawings, the mobile unit U includes the truck 1 having a rigid main frame F rigidly fixed at its rear end. The frame F has a generally rectangular (FIGURE 3) upper portion which is formed by welding together the channel iron members 2, 3, 4 and 5. This upper portion is supported by and welded to the four corner posts 6, 7, 8 and 9 (FIGURES 1 and 4) which are in turn secured to the truck frame 10.

A mixing drum 12 is rotatably mounted within the frame F and on the truck frame and has a forward inlet opening 13 (FIGURE 4) and a rear discharge opening 14. An internal combustion power plant 15 has a conventional drive connection (not shown) with the annular gear 16 fixed around the drum periphery to thereby rotate the mixing drum in the known manner.

The mixing drum has a conventional rearwardly extending discharge chute 18 from which the completed mixture is discharged.

A water tank 19 (FIGURE 1) is mounted on the truck frame and provides a source of water for the material to be mixed, such as concrete.

An accumulating and storage hopper 20 and a clam bucket 21 together with its articulated boom 22 are mounted as a unit on the frame F by means of an auxiliary, rectangular frame AF. Frame AF is fabricated by the welding together of the three large channel members 26, 27, and 28, and the large tubular member 29. This frame AF is then floatingly mounted within the upper rectangular portion of the main frame F by four rocker arms 30, 31, 32, and 33, as follows.

Two rocker arms 30 and 31 are pivoted, respectively, at 30a and 31a to the front side of the frame F (FIGURE 5). The other two rocker arms 32 and 33 are pivotally mounted to the rear side of frame F (FIGURE 6) at 32a and 33a, respectively.

The outer ends of arms 30 and 33 are rigidly connected together by being welded to opposite ends of a torsion tube 35. Arms 31 and 32 are similarly welded to torsion bar 36.

The auxiliary frame AF is pivotally connected to the rocker arms by the four links 40, 41 (FIGURE 5), and 42, 43 (FIGURE 6).

It will be noted from FIGURE 6 that the inner ends of the long arms 30 and 31 are pivoted together and to one end of the fulcrum arm 44 by a link 45. Arm 44 is fulcrumed intermediate its length to the auxiliary frame AF by means of the link 46. The other end of the fulcrum arm is anchored to the main frame F by the scale means S which gives a reading in accordance with the amount of extension of the scale means, and an adjustable weight 43 is slidable on the fulcrum arm to set the scale, in the known manner.

Thus, a weighing means is provided for the auxiliary frame on which are mounted the previously mentioned hopper 20, articulated boom 22, and the clam bucket 21, now to be described in greater detail.

The hopper 20 is fixed by brackets 50, 51, 52, and 53

(FIGURES 3 and 4) to and within the rectangular auxiliary frame AF. This hopper is of sufficient size to hold a complete batch of materials for mixing in the drum and thus functions as a storage hopper as well as simply a hopper for directing materials into the drum. The four inclined sides of the hopper direct the material to the lower discharge opening 54 which is closeable by the hinged gate 55. A double-acting hydraulic ram means 56 acts through arm 57 attached to the gate to actuate the latter. The material falls by gravity through chute 58 and into the mixer drum through opening 13. Opening 13 is large enough to permit drum rotation without interference from the chute, and the hopper and its chute can move slightly vertically together with the auxiliary frame AF as a unit and independently of the mixer drum.

The clam bucket 21 is opened and closed by a small double-acting hydraulic ram means 60, extension of this ram means being effective to close the bucket.

The articulated boom 22 comprises an outer arm section 61 which is pivoted at one end to the bucket, and at the other end to a main section 62. A double-acting hydraulic ram means 63 is connected between these sections to cause the arm section to swing relative to the main section. The main section is pivoted on pin 65 (FIGURE 4) to the upper end of a rotatable, vertical sleeve 66. This sleeve is in turn rotatably mounted on the stationary post 67 which extends through and is welded to the tubular frame member 29. A sleeve bearing 68 is secured on a reduced top portion of post 67 and a lower bearing sleeve 69 is also interposed between sleeve 66 and post 67.

A ring sprocket 70 is fixed around the lower end of the sleeve, and a roller chain is trained around this sprocket. The ends of the chain are attached to the piston rods of double-acting hydraulic ram means 72 and 73, both of which are also secured to the weigh frame AF. More specifically, the cylinders of the ram means are fastened to frame members 75 and 76, respectively (FIGURES 2 and 3), which in turn are fixed to the weigh frame AF.

The articulated boom 22 is thus mounted for horizontal swinging about the vertical axis formed by the sleeve 66 and post 67 by the ram means 72 and 73.

A large, double-acting hydraulic cylinder means 80 is provided between the sleeve 66 and intermediate the length of main section 62.

It will be noted that the bucket and its boom, the hopper, and the auxiliary or weigh frame AF are all secured together as a unit and their weight is transmitted through the rocker arms to the scale. Thus, this total weight can be balanced by the weight 48 of the scale mechanism, to give a zero reading on the scale. Therefore, the weight of any material in the hopper or in the bucket, or both, can be read directly on the face of the scale.

With this weighing arrangement, there is no need for the operator to keep track of the number of bucket fulls or the weight of the material which he has dumped into the hopper. Furthermore, material in the bucket can be dribbled out until the exact total weight desired is indicated on the scale, and at that time the operator closes the bucket and dumps it into the hopper.

In connection with the articulated boom structure, the vertical pivot point for the boom is located at the extreme rear of the frame F and the horizontal pivot shaft 65 is located above the hopper. Furthermore, arm section 61 is shorter than main section 62. As a result, when rams 80 and 63 are both fully contracted as shown by the full lines in FIGURE 1, and the boom is swung directly to the rear, the bucket is in material receiving communication with the mixer discharge spout 18, and there is no need for the operator to estimate this position or the extent to which he should contract these rams.

When ram 80 is fully extended, ram 63 fully contracted, and the boom centered directly forwardly, then the operator knows the bucket is directly over and clear of the hopper for complete discharge of the bucket into the hopper.

With the above boom construction, the operator has good "feel" and control of the operations of the bucket regardless of whether he can actually see the bucket. As shown in FIGURE 2, the material such as sand, aggregate or cement may be in various locations and their loading into the bucket usually requires the operator's attention at that area. It is thus desirable if the operator can be relieved of the necessity of continual close scrutiny of each and every position of the bucket.

The means for measuring or batching the water will now be described, reference being had primarily to FIGURE 7. With this improved water measuring system, the water is injected into the mixer drum 12 via conduit 82 from the supply tank 19 by means of a hydraulically actuated plunger 83. Plunger 83 is slidable in the batcher 84 to pump the water and water pressure of about 5–10 p.s.i. is developed in the batcher. Water from the tank 19 supplies the batcher with water via conduit 85 and when a stroke of the plunger 83 to the right occurs, by means to be described, a measured amount of water, say for example 17 gallons, is pumped from the batcher and via conduit 82 into the mixer drum 12 in a short period of time, say about 6 to 8 seconds. Plunger 83 is attached to and actuated by the rod 86 of the double-acting hydraulic cylinder 87. Conduits 88 and 89 extend, respectively, from the head and rod ends of the cylinder 87 and place them in operative communication with a control valve V which also actuates the hopper gate ram means 56. Conduits 90 and 91 place the head and rod ends, respectively, of ram means 56 in communication with the valve V. The arrangement is such that when the valve is shifted to the "A" position, fluid pressure is directed to the head ends of cylinder 87 and ram means 56, to thereby cause water and material from the hopper to simultaneously enter the mixer drums.

Operation of valve V is commenced manually when the operator moves lever 97 to the "A" position which starts pumping action of the water. Moving valve V to the "A" position also pivotally swings the latch 98 through connecting link 99 allowing spring 101 to move rod 104 and abutment 108 to the left holding lever 98 and valve V in "A" position (as shown in dotted line FIG. 7).

The amount of water to be delivered for each charge is determined by the position of the gallonage indicator stop 103 which is manually adjusted by rotation of threaded shaft 104 to the desired gallonage on scale 105.

When plunger 83 travels to the right (FIGURE 7) in pumping the water, it carries the connected follow-up rod 107 with it. Abutment 106 on this rod then strikes the stop 103 and shifts shaft 104 to the right. This causes abutment 108 of the shaft 104 to free latch 98, permitting the valve return spring 109 to urge valve V to the "B" position.

Pressure fluid then retracts ram means 56 to shut the hopper gate, and the fluid also retracts piston 86 and consequently the water plunger 83. When plunger 83 has returned to the left sufficiently to strike the shiftable rod 110 (which may be spring loaded to provide a definite force), the latter strikes latch 98 and through link 99 causes the lever 97 and the valve V to return to the neutral position.

The remainder of the hydraulic circuit includes two hydraulic pumps P and P1 which are both driven from the engine 15. Manually operated directional control valves V1, V2, V3 and V4 are used to independently operate, respectively, the boom cylinder 80, arm cylinder 63, bucket cylinder 60 and boom swing cylinders 72 and 73.

*Résumé*

The present invention provides a mobile, self-batching mixer in which both the contents of the hopper and the bucket can be accumulatively weighed, and the contents of the bucket dribbled out to give the exact total weight desired. It is unnecessary to unload any material from the hopper in order to arrive at the correct total weight. It is furthermore unnecessary for the operator to keep track of the number or weights of previous bucketfuls dumped into the hopper in order to ascertain the total weight.

The storage hopper with its closable discharge gate can be used selectively as an accumulating hopper, or as a storage hopper for transporting a second batch of materials while a first batch is being mixed in the drum.

The particular boom construction in the above self-batching mixer provides easy and accurate control of the bucket with a minimum amount of attention.

With the single control water batcher arrangement, both dry material and water can be simultaneously dumped into the hopper with one push of the control handle and further attention of the operator is unnecessary for the completion of these operations and the return to starting position of the various component parts.

Various modes of carrying out the invention are contemplated as being within the scope of the following claims particularly pointing out and distinctly claiming the subject matter which is regarded as the invention.

I claim:

1. A mobile, self batching mixer comprising, a main frame, a mixer drum rotatably mounted on said main frame, a weigh frame shiftably mounted on said main frame, an articulated boom and bucket swingably mounted on said weigh frame, a hopper mounted on said weigh frame and communicable with said drum, and scale means connected with said weigh frame for weighing the contents of said bucket and hopper.

2. In combination with a mobile, self batching mixer of the type comprising a self-propelled vehicle having a main frame, and a mixer drum rotatably mounted in said main frame, a weigh frame shiftably mounted on said main frame, a material hopper mounted on said weigh frame and having a closable discharge door to selectively store material in said hopper or discharge it into said drum, an articulated boom swingably mounted at one end on said weigh frame and having a clam bucket operatively mounted on its other end, and scale means connected to said weigh frame.

3. A mobile, self batching mixer comprising, a main frame, a mixer drum rotatably mounted on said main frame, a weigh frame shiftably mounted on said main frame, an articulated boom and bucket swingably mounted on said weigh frame, a hopper mounted on said weigh frame and having a closable discharge door for selectively permitting storage of material in said hopper or discharge of material into said drum, and scale means connected with said weigh frame for weighing the contents of said bucket and hopper.

4. A mobile, self batching mixer comprising, a main frame, a mixer drum rotatably mounted on said main frame, a weigh frame shiftably mounted on said main frame, an articulated boom mounted on one end to the rear end of said weigh frame for swinging in horizontal and vertical directions, a clam bucket operatively secured to the other end of said boom, said boom having a main section and an outer arm section pivotally secured together, hydraulic ram means for swinging said sections relative to one another and to said weigh frame, a storage hopper also mounted on said weigh frame and communicable with said drum, and scale means connected with said weigh frame for weighing the contents of said bucket and hopper.

5. A mobile, self batching mixer comprising, a self-propelled vehicle having a main frame, a mixer drum rotatably mounted on said main frame, a generally rectangular-in-plan weigh frame shiftably mounted on said main frame and having a front side and a rear side, an articulated boom mechanism including a bucket and swingably mounted on said rear side of said weigh frame, and a hopper having a closable discharge door and mounted within said rectangular weigh frame and adjacent the front side thereof, and scale means connected with said weigh frame for weighing the contents of said bucket and hopper.

6. A mobile, self batching mixer comprising, a self-propelled vehicle having a main frame, a mixer drum rotatably mounted on said main frame and having a discharge opening at the rear of said vehicle, a weigh frame shiftably mounted on said main frame and having front and rear ends, a storage hopper communicable with said drum and mounted on said weigh frame and at a height above the drum discharge opening, an articulated boom mounted on one end to the rear end of said weigh frame for swinging in horizontal and vertical directions, said boom having a main section and an outer arm section pivotally secured together at one of their ends, a clam bucket operatively secured to the other end of said arm section, first hydraulic cylinder means for swinging said sections relative to one another, and a second hydraulic cylinder means for swinging said main section relative to said weigh frame, the lengths of said sections being such that when said cylinder means are both fully retracted the bucket is at a height to receive material from said discharge opening and when said first hydraulic means is fully retracted and said second hydraulic means is fully extended the bucket is at a height to discharge into said hopper.

References Cited in the file of this patent

UNITED STATES PATENTS

| | | |
|---|---|---|
| 2,533,852 | Tietig | Dec. 12, 1950 |
| 2,703,227 | Hughes | Mar. 1, 1955 |
| 2,926,796 | Martinson | Mar. 1, 1960 |